(12) United States Patent
Yamada

(10) Patent No.: US 10,315,612 B2
(45) Date of Patent: Jun. 11, 2019

(54) VEHICLE HOOD LIFT SYSTEM

(71) Applicant: Honda Motor Co., Ltd., Tokyo (JP)

(72) Inventor: Hirotomo Yamada, Utsunomiya (JP)

(73) Assignee: HONDA MOTOR CO., LTD., Tokyo (JP)

(*) Notice: Subject to any disclaimer, the term of this patent is extended or adjusted under 35 U.S.C. 154(b) by 206 days.

(21) Appl. No.: 15/245,989

(22) Filed: Aug. 24, 2016

(65) Prior Publication Data
US 2018/0056927 A1 Mar. 1, 2018

(51) Int. Cl.
B60R 21/38 (2011.01)
E05D 3/12 (2006.01)
B60R 21/00 (2006.01)

(52) U.S. Cl.
CPC .............. B60R 21/38 (2013.01); E05D 3/125 (2013.01); B60R 2021/0004 (2013.01); E05Y 2900/536 (2013.01)

(58) Field of Classification Search
CPC . B60R 21/38; B60R 2021/0004; E05D 3/125; E05Y 2900/536
See application file for complete search history.

(56) References Cited

U.S. PATENT DOCUMENTS

| 2,987,753 | A | * | 6/1961 | Krause | E05D 3/06 16/288 |
| 3,815,176 | A | * | 6/1974 | Porter | E05D 3/145 16/288 |
| 4,727,621 | A | * | 3/1988 | Emery | E05D 3/125 16/239 |
| 6,618,904 | B1 | * | 9/2003 | Nagy | E05D 3/145 16/288 |
| 6,834,735 | B2 | | 12/2004 | Kim | |
| 6,934,999 | B2 | * | 8/2005 | Kreth | B60R 21/34 16/222 |
| 6,942,056 | B2 | * | 9/2005 | Nadeau | B60R 21/38 180/274 |
| 7,073,846 | B2 | * | 7/2006 | Borg | B60R 21/38 180/274 |
| 7,080,428 | B2 | * | 7/2006 | Hyde | E05D 7/1061 16/231 |

(Continued)

FOREIGN PATENT DOCUMENTS

CN 104675243 A 6/2015
DE 19957872 A1 6/2001

(Continued)

Primary Examiner — Paul N Dickson
Assistant Examiner — Timothy Wilhelm
(74) Attorney, Agent, or Firm — Kenealy Vaidya LLP

(57) ABSTRACT

A hinge assembly includes a hood bracket connected to a vehicle hood. The hood bracket includes a side plate defining a slot having a perimeter entirely bounded by the side plate so as to be spaced from a side plate edge, the side plate also defining a notch open at the side plate edge. A hinge arm has first and second ends rotatably connected to a vehicle body and the hood bracket. The hinge arm includes a slot engagement member extending into the slot to limit a range of rotation of the hood bracket relative to the hinge arm, and a notch engagement member extendable into the notch and configured to removably secure the hinge arm to the hood bracket to limit rotational movement therebetween.

20 Claims, 11 Drawing Sheets

(56) References Cited

U.S. PATENT DOCUMENTS

| | | | |
|---|---|---|---|
| 7,093,877 B2* | 8/2006 | Duffy | E05D 3/16 296/76 |
| 7,293,624 B2 | 11/2007 | Adachi | |
| 7,475,752 B2* | 1/2009 | Borg | B60R 21/38 180/274 |
| 7,506,716 B1 | 3/2009 | Salmon et al. | |
| 7,552,789 B2* | 6/2009 | Gust | B60R 21/38 180/69.21 |
| 7,575,273 B2* | 8/2009 | Wallman | B60R 21/38 180/274 |
| 7,597,166 B2 | 10/2009 | Parks | |
| 7,637,344 B2* | 12/2009 | Park | B60R 21/38 180/274 |
| 7,690,465 B2* | 4/2010 | Hirata | B60R 21/34 180/69.2 |
| 7,815,007 B2* | 10/2010 | Mori | B60R 21/38 180/274 |
| 7,845,053 B2* | 12/2010 | Marsh | E05D 11/06 16/286 |
| 7,845,715 B2* | 12/2010 | Lim | E05D 5/0207 16/319 |
| 7,896,122 B2* | 3/2011 | Borg | B62D 25/12 180/274 |
| 7,934,293 B2* | 5/2011 | Kalargeros | B60R 21/38 16/357 |
| 7,946,376 B2* | 5/2011 | Hayashi | B60R 21/38 180/274 |
| 7,954,588 B2* | 6/2011 | Inomata | B60R 21/38 180/274 |
| 8,069,943 B2* | 12/2011 | Takahashi | B62D 25/12 180/274 |
| 8,141,671 B2* | 3/2012 | Aoki | B62D 25/12 180/274 |
| 8,201,306 B2* | 6/2012 | Kim | E05C 17/32 16/357 |
| 8,307,935 B2* | 11/2012 | Takahashi | B60R 21/38 180/274 |
| 8,311,701 B2* | 11/2012 | Iwai | B60R 21/38 180/69.23 |
| 8,387,214 B2* | 3/2013 | Jung | E05F 15/47 16/354 |
| 8,398,125 B2* | 3/2013 | Takahashi | B60R 21/34 16/222 |
| 8,419,106 B2* | 4/2013 | Baba | E05D 11/1007 296/107.08 |
| 8,484,804 B2* | 7/2013 | Mehta | B60R 21/38 16/368 |
| 8,528,959 B2* | 9/2013 | Baba | E05F 5/022 296/97.22 |
| 8,534,410 B2* | 9/2013 | Nakaura | B60R 21/38 180/274 |
| 8,544,590 B2* | 10/2013 | McIntyre | B60R 21/38 180/274 |
| 8,726,466 B2 | 5/2014 | Kim | |
| 8,768,574 B1* | 7/2014 | Shaw | B60R 21/38 180/274 |
| 8,893,354 B2* | 11/2014 | McIntyre, I | B60R 21/38 16/288 |
| 8,939,249 B2* | 1/2015 | Kuhr | B60R 21/38 180/274 |
| 9,085,282 B2* | 7/2015 | Agell Merino | E05D 11/00 |
| 9,121,212 B2* | 9/2015 | Carothers | E05F 3/20 |
| 9,283,925 B2* | 3/2016 | Mardi | B60R 21/38 |
| 9,327,677 B2* | 5/2016 | Fermer | E05D 3/125 |
| 9,475,452 B2* | 10/2016 | Lindmark | B62D 25/12 |
| 9,481,340 B2* | 11/2016 | Kim | B60R 21/34 |
| 9,551,175 B2* | 1/2017 | Labbe | E05D 3/02 |
| 9,701,277 B2* | 7/2017 | McIntyre | B60R 21/38 |
| 9,708,010 B2* | 7/2017 | Inoue | B60R 21/38 |
| 9,764,711 B2* | 9/2017 | Narita | B62D 25/10 |
| 9,783,154 B2* | 10/2017 | Kim, II | B60R 21/34 |
| 9,821,755 B2* | 11/2017 | Farooq | B60R 21/013 |
| 2005/0279550 A1 | 12/2005 | Saville et al. | |
| 2007/0075554 A1* | 4/2007 | Gavriles | E05F 1/1091 292/339 |
| 2008/0034552 A1* | 2/2008 | Nguyen | E05D 3/145 16/375 |
| 2009/0288271 A1* | 11/2009 | Kmieciak | B60R 21/38 16/308 |
| 2009/0289473 A1* | 11/2009 | Kmieciak | B60R 21/38 296/193.11 |
| 2017/0036643 A1* | 2/2017 | Matsushima | B62D 25/08 |
| 2017/0057458 A1* | 3/2017 | Narita | B60R 21/38 |
| 2017/0259776 A1* | 9/2017 | McLundie | B60R 21/38 |
| 2017/0282847 A1* | 10/2017 | Jenny | B60R 21/38 |
| 2017/0369028 A1* | 12/2017 | Patterson | B60R 21/38 |
| 2018/0079385 A1* | 3/2018 | Henck | B60R 21/38 |

FOREIGN PATENT DOCUMENTS

| | | |
|---|---|---|
| DE | 102004041423 A1 | 3/2006 |
| DE | 102008050678 A1 | 4/2010 |
| EP | 1216171 B1 | 8/2003 |
| EP | 1494895 B1 | 2/2007 |
| EP | 1880907 A1 | 1/2008 |
| EP | 2108549 A1 | 10/2009 |
| EP | 2345563 A1 | 7/2011 |

* cited by examiner

VEHICLE HOOD LIFT SYSTEM

BACKGROUND

Vehicle hood lift systems, also known as pop up hood systems, promote pedestrian safety by elevating a rearward portion of the hood upon detection of an imminent collision such that a distance between the rearward hood portion and underlying vehicle components (e.g., the engine) is increased. Actuation of conventional hood lift systems often results in deformation of hood components, such as the hood hinge arm, requiring replacement of parts and significant repair costs and delays.

A need was identified for a robust vehicle hood lift system capable of elevating the rearward portion of the hood without substantial deformation of hood components such that the hood system can be readily returned to a normal operating condition without significant repair costs and delays.

SUMMARY

According to one aspect, a hinge assembly includes a hood bracket connected to a vehicle hood. The hood bracket includes a side plate defining a slot having a perimeter entirely bounded by the side plate so as to be spaced from a side plate edge, the side plate also defining a notch open at the side plate edge. A hinge arm has first and second ends rotatably connected to a vehicle body and the hood bracket. The hinge arm includes a slot engagement member extending into the slot to limit a range of rotation of the hood bracket relative to the hinge arm, and a notch engagement member extendable into the notch and configured to removably secure the hinge arm to the hood bracket to limit rotational movement therebetween.

According to another aspect, a vehicle hood assembly includes a hood. The vehicle hood assembly also includes a hood bracket connected to the hood. The hood bracket includes a side plate that defines a slot having a perimeter that is entirely bounded by the side plate so as to be spaced from a side plate edge, the side plate also defining a notch that is open at the side plate edge. A hinge arm has first and second ends rotatably connected to a vehicle body and the hood bracket. The hinge arm includes a slot engagement member that extends into the slot so as to limit a range of rotation of the hood bracket relative to the hinge arm, and a notch engagement member extendable into the notch and configured to removably secure the hinge arm to the hood bracket to limit rotational movement therebetween.

According to yet another aspect, a method can be provided for manufacturing a hinge assembly for use with a vehicle hood assembly that includes a hood attached to a body and an actuator that moves at least a rear portion of the hood away from the body, the method comprising: configuring a side plate of a hood bracket, which is connectable to the hood, so as to define a slot having a perimeter that is entirely bounded by the side plate so as to be spaced from a side plate edge; forming a notch in the side plate that is open at the side plate edge; rotatably connecting a first end of a hinge arm to the body; rotatably connecting an opposite second end of the hinge arm to the hood bracket; configuring the arm to include a slot engagement member that extends into the slot so as to limit a range of rotation of the hood bracket relative to the hinge arm; providing a notch engagement member for the hinge arm, the notch engagement member extendable into the notch and configured to removably secure the arm to the bracket to limit rotational movement therebetween; and configuring the notch engagement member to disengage from the bracket upon application of a predetermined force to allow the bracket to rotate relative to the arm within the range provided by the slot engagement member.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Various headings are provided below for convenience and clarity. However, these headings are not intended to limit the scope or content of the disclosure, and/or the scope of protection afforded the various inventive concepts disclosed herein.

I. Overall Vehicle

Figure 1:
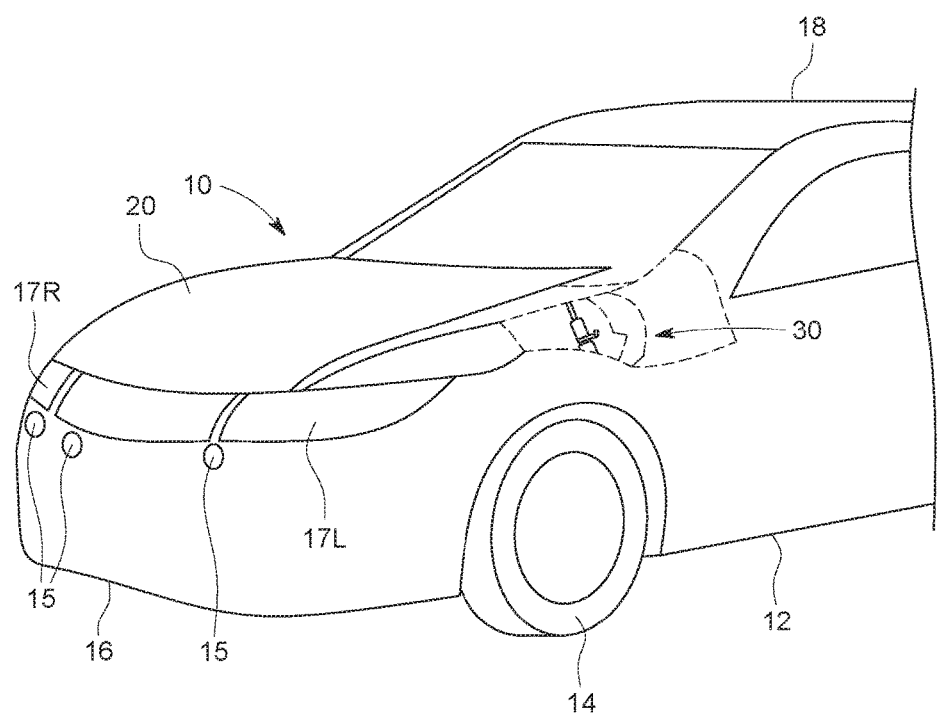
FIG. 1 is a partial perspective view of an exemplary vehicle including a hood lift system in accordance with the disclosed subject matter.

FIG. 1 is a partial perspective view of an exemplary vehicle 10 including a hood lift (or pop up hood) system 30 in accordance with the disclosed subject matter. The vehicle 10 shown in FIG. 1 is primarily for use on paved roadways, and can be referred to as a passenger vehicle. The vehicle 10 may also be for use on unpaved roadways consisting of gravel, dirt, sand, etc.

However, the disclosed hood lift system 30 can be used with any vehicle that is configured for travel along any one or combination of improved, unimproved, and unmarked roadways and paths consisting of gravel, dirt, sand, etc. For example, embodiments are intended to include or otherwise cover any type of automobile, including passenger car, minivan, truck, etc.

The vehicle 10 can include a body 12, front wheels 14, rear wheels (the rear wheels are not shown), door assemblies, a bumper assembly 16, headlights 17L,R, a roof 18, and a hood 20. Other vehicle components including chassis (e.g., frame, suspension) and powertrain are omitted from FIG. 1 for simplicity and clarity of the drawings.

The hood 20 can be connected to a rearmost side of an engine compartment in the body 12, such that the engine compartment can be located between the bumper assembly 16 and a windshield. The hood can extend from the bumper assembly 16 to a base of the windshield to span the engine compartment.

The hood lift system 30 of the vehicle 10 can connect a rear portion of the hood 20 to the body 12. In the present embodiment, the vehicle 10 can include a pair of hood lift systems 30 connected to opposing sides of the rear portion of the hood 20. The hood lift systems 30 are configured to provide pivoting of the hood 20 between opened and closed positions in a normal hood operating condition as well as lifting a rear portion of the hood 20 in a lift actuated condition as will be described below.

II. Hood Lift System

Figure 2:
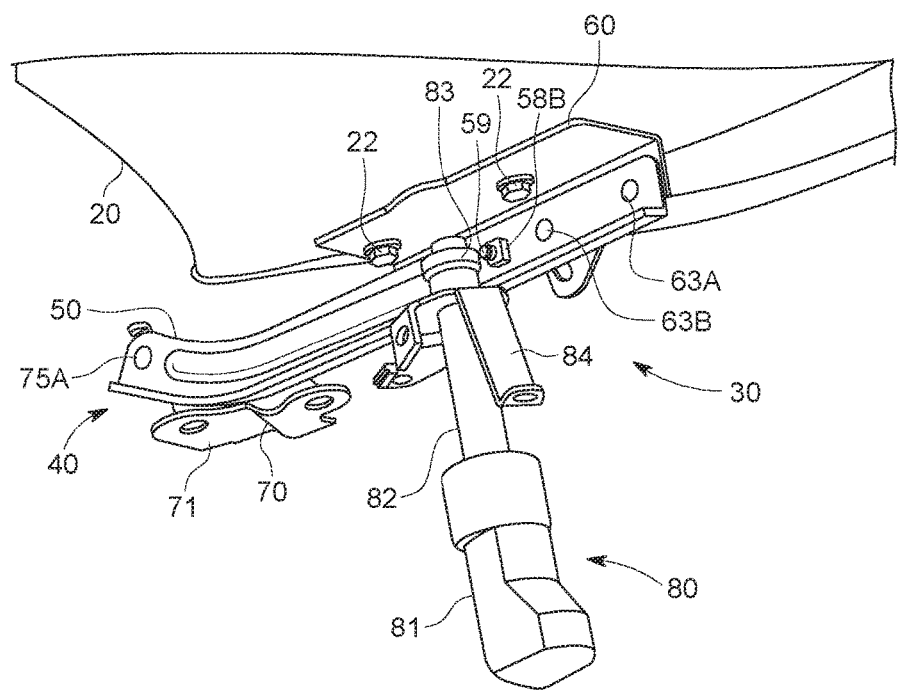
FIG. 2 is a perspective view of the exemplary hood lift system including a hinge assembly and a lift actuator.

FIG. 2 is a perspective view of the exemplary hood lift system 30 including a hinge assembly 40 and a lift actuator 80. (The left-side hood lift system 30 is shown in the drawing, while the right-side hood lift system 30 at an opposing side of the rear portion of the hood 20 approximately mirrors the left-side hood lift system 30 and is omitted.) The hood lift system 30 can be configured to support pivoting motion of the hood 20 from the body 12 such that the hood 20 can be rotated between opened and closed positions in the normal hood operating condition of system 30. The hood lift system 30 can be configured to withstand repeated opening and closing operation of the hood 20, and is sufficiently robust in configuration to limit hood vibrations during operation of the vehicle 10 during high speed driving or in rough road conditions. As will be discussed in greater detail below, the hood lift system 30 is also configured to lift the rear portion of the hood 20 upwards and away from the body 12 during a collision between a front end of the vehicle 10 and the pedestrian.

The hood lift system 30 can include a hinge assembly 40 and a lift actuator 80. As will be discussed in greater detail below, the hinge assembly 40 can cooperate with the lift actuator 80 during an impact event sensed by bumper sensors 15 in the bumper assembly 16 to thereby raise the rear portion of the hood 20 so that additional space is created between the hood 20 and rigid portions of the vehicle 10 underlying the hood such as the engine. Creating additional space between the hood 20 and underlying components such as the engine serves to limit contact between a pedestrian and the rigid vehicle portions during a collision. The hinge assembly 40 of the hood lift system 30, however, is also robust in construction so as to retain its integrity in non-pedestrian collisions (e.g., vehicle/vehicle or vehicle/tree) in which significant longitudinal impact loads can be transmitted through the hood 20 to the hood hinge. In these situations, the hinge assembly 40 remains fixed longitudinally while the hood 20 is deformed (e.g., buckles). This is desirable compared to conventional hood lift systems in which hinge components may be deformed, and thereby weakened, by the lift actuation potentially resulting in rearward translation of the hood 20 and the hood hinge. Thus, the robust construction of the hinge assembly 40 of the present embodiment can serve to avoid or limit potential collisions between the hood 20 and the windshield of the vehicle 10 resulting from rearward translation of the hood 20. The configuration of the hinge assembly 40 also remains robust with respect to the lateral vehicle direction (i.e., the assembly retains integrity to resist deflection laterally under loading.

The lift actuator 80 can be disposed adjacent the hinge assembly 40 such that an upper portion of the lift actuator 80 can be in contact with the hinge assembly 40. The lift actuator 80 and the hinge assembly 40 can each be configured with mounting points for attachment to the body 12 (e.g., adjacent the engine compartment).

The hinge assembly 40 and the lift actuator 80 of the hood lift system 30 can be made from any appropriate structural element(s), such as but not limited to tubes, beams, stampings, etc., that can provide sufficient strength and rigidity for normal operation of the hood 20 as well as hood lift actuation (i.e., pop up actuation) by the hood lift system 30 while still retaining robustness and integrity to resist impact loading that might be applied to the hood in non-pedestrian collision, as discussed above. The structural elements can have any appropriate cross-sectional shape, such as but not limited to circular, rectangular, regular polygonal, irregular polygonal, hollow, solid, variable along the length of the structural element, etc.

The structural elements can be formed by any appropriate process, such as but not limited to rolling, hydroforming, bending, welding, extruding, stamping, any combination of these processes, etc. Each structural element of the hood lift system 30 can be formed from any appropriate material, such as but not limited to steel, aluminum, titanium, magnesium, fiber-reinforced plastic, carbon fiber, a composite formed from any combination of these exemplary materials, etc. Each structural element of the hood lift system 30 can be connected to each adjoining structural element in any appropriate manner, such as but not limited to mechanical fasteners, welding, adhesive, any combination thereof, etc.

III. Hinge Assembly

The hinge assembly 40 can be connected to the hood 20 by fasteners inserted through overlapping apertures extending through a hood bracket 60 of the hinge assembly 40 and the hood 20. The hinge assembly 40 can also be connected to the body 12 by fasteners inserted through overlapping apertures extending through a body bracket 70 of the hinge assembly 40 and the body 12. The hood bracket 60 and the body bracket 70 are each pivotably connected to opposite ends of a hinge arm 50.

Figure 3:
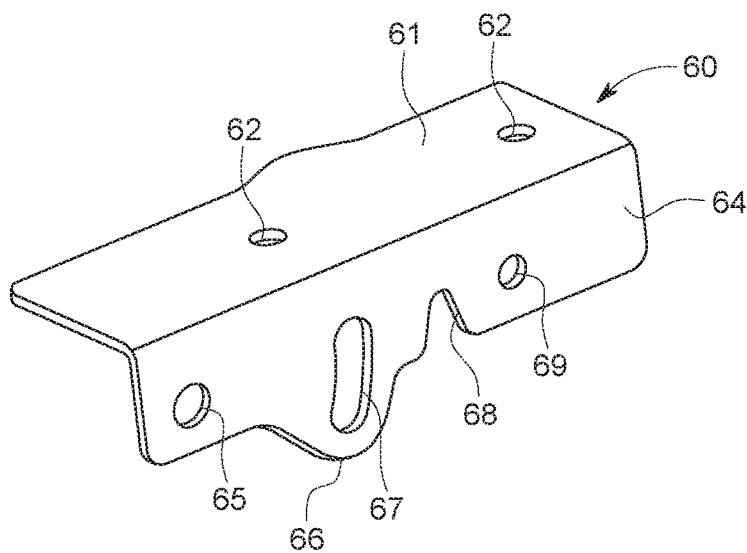
FIG. 3 is a perspective view of an exemplary hood bracket of the hinge assembly.

FIG. 3 is a perspective view of an exemplary hood bracket 60 of the hinge assembly 40. As described above, the hood bracket 60 can be connected to an underside of the hood 20. The hood bracket 60 is thereby configured to move with the hood 20 as the hood 20 transitions between opened and closed positions in the normal hood operating condition, as well as lifting the rear portion of the hood 20 in the lift actuated condition as will be described below. As the hood bracket 60 moves with the hood 20, the hood bracket 60 pivots during lift actuation about an end of the hinge arm 50 to which the hood bracket 60 is connected.

The hood bracket 60 can include a top plate 61 and a side plate 64, the top and side plates 61, 64 being planar and extending approximately perpendicular to each other. The top and side plates 61, 64 can be formed from a unitary plate such that a bend at an intermediate portion of the unitary plate forms the top and side plates 61, 64 to be approximately perpendicular. In some embodiments, the top and side plates 61, 64 can be formed of distinct plates rather than bending a unitary plate. The top and side plates 61, 64 may also be oriented so as to be alternatively angled from one another and not perpendicular.

The top plate 61 can include hood apertures 62 through which hood fasteners 22 may be inserted to connect the hood bracket 60 to the hood 20. In the present embodiment, the top plate 61 can have the pair of hood apertures 62 correspond to a pair of apertures in the hood 20 that align with the hood apertures 62. However, any suitable number of apertures and corresponding fasteners may be used to connect the hood bracket 60 to the hood 20.

The side plate 64 can include a linkage axis aperture 65, a guide slot 67 formed in a guide tab 66, a fixing notch 68, and a datum (or jig) aperture 69 (e.g., for receiving a locator pin). The linkage axis aperture 65 can be disposed at an end portion of the side plate 64, and can be configured such that an upper hinge linkage pin 63A can be inserted therethrough to connect the hood bracket 60 to the hinge arm 50, as will be described below. The guide tab 66 can extend from a lower edge of the side plate 64 so as to increase a height of the side plate 64 at an intermediate portion, the guide tab 66 having the guide slot 67 disposed therein. The guide slot 67 can be arcuate and oriented to curve around the linkage axis aperture 65 such that a slot engaging member, depicted as a pin 63B can slide through the guide slot 67 as the hood bracket 60 rotates about the linkage axis aperture 65. Therefore, the guide slot 67 can be formed with a convex side facing the linkage axis aperture 65. The guide slot 67 can serve to ensure movement of the hood 20 within a prescribed range during the actuation of the hood lift system 30, as will be described below. The fixing notch 68 can be disposed proximate the guide slot 67 such that the guide slot 67 is positioned between the linkage axis aperture 65 and the fixing notch 68 in the side plate 64. The fixing notch 68 can be configured as a notch extending in a direction of elongation of the guide slot 67 such that the height of the intermediate portion of the side plate 64 at the fixing notch 68 is decreased. The fixing notch 68 can be configured for engagement with a notch-engagement member, which is depicted in the figures as a fixing bolt 59, to secure the hinge arm 50 with respect to the hood bracket 60 in the normal hood operating condition, as will be described below. The side plate 64 can further include a datum (or jig) aperture 69 for alignment with corresponding datum aperture 57 in hinge arm 50 and temporary receipt of a locator pin. This establishes a desired relative angular position between the hinge arm 50 and the hood bracket 60 during initial assembly (or re-assembly following pop up actuation) when notch-engaging bolt 59 is being engaged to the notch 68.

Figure 4:
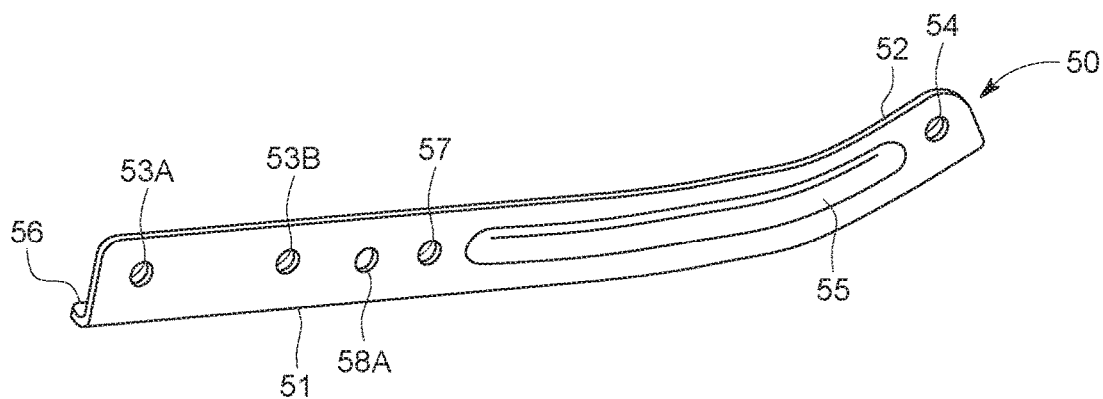
FIG. 4 is a perspective view of an exemplary hinge arm of the hinge assembly.

FIG. 4 is a perspective view of the hinge arm 50 of the hinge assembly 40. The hinge arm 50 can be formed as an elongated bar including an arm body 51 and an arm end portion 52. The arm body 51 can make up a majority of the hinge arm 50, with the arm end portion 52 configured to curve away from a direction of elongation of the arm body 51.

The arm body 51 can include apertures disposed within an end portion of hinge arm 50 opposite the arm end portion 52. The apertures include a linkage axis aperture 53A configured to align with the linkage axis aperture 65 of the hood bracket 60 and a guide aperture 53B configured to align with the guide slot 67 of the hood bracket 60. As the hood bracket 60 and the hinge arm 50 rotate in relation to one another about the upper hinge linkage pin 63A, the slot engaging pin 63B extending through the guide slot 67 can contact an end of the slot during relative movement between the hood bracket 60 and hinge arm 50. This ensures that the hood bracket 60 does not rotate outside of the prescribed range of motion with respect to the hinge arm 50. Thus, the guide slot 67 and the slot engaging pin 63B serve as a stopper mechanism for limiting upward movement of the hood 20 via the hood bracket 60 during lift actuation.

The arm body 51 of the hinge arm 50 can also include a fixing aperture 58A disposed at an intermediate portion of the arm body 51 such that the fixing aperture 58A is positioned between the release apertures 53 and the arm end portion 52. The fixing aperture 58A is configured to align with the fixing notch 68 in the hood bracket 60 when the hood lift system 30 and the hood 20 are in the normal operating condition. The fixing aperture 58A can have a fixing bolt 59 (shown in more detail in FIG. 6) inserted therethrough such that the fixing bolt 59 is configured to engage the fixing notch 68 in the normal operating condition. The fixing bolt 59 serves to secure the hood bracket 60 against the hinge arm 50 prior to actuation of the lift actuator 80, as will be described below. The arm body 51 can further include a datum aperture 57. The datum aperture 57 of the hinge arm 50 is configured to receive a locator pin that would also be received by the datum aperture 69 of the hood bracket 60 when the datum apertures 57, 69 are aligned with each other.

The arm end portion 52 can be configured to extend in a curved manner from the arm body 51, and can include an end portion aperture 54. The end portion aperture 54 can be configured to align with an upper aperture 75B of the body bracket 70 such that a hinge axis pin 75A can be inserted therethrough to connected the hinge arm 50 to the body bracket 70, as will be described below. Curvature of the arm end portion 52 from the arm body 51 can be towards the hood 20 in the present embodiment, however other embodiments may include the arm end portion 52 having curvature away from the hood 20, or alternatively having no curve at all and instead being approximately straight.

The hinge arm 50 can also include a stiffness bead 55 extending from a portion of the arm body 51 to a portion of the arm end portion 52. The stiffness bead 55 reinforces the hinge arm to provide structural rigidity.

The hinge arm 50 can further include a stiffening flange 56 extending along a lower side of the hinge arm 50, the stiffness flange 56 being formed approximately perpendicular to a direction of elongation of the hinge arm 50. In the present embodiment, the stiffening flange 56 can be formed as a bent portion of the hinge arm 50, and can serve to further improve structural rigidity.

Figure 5:
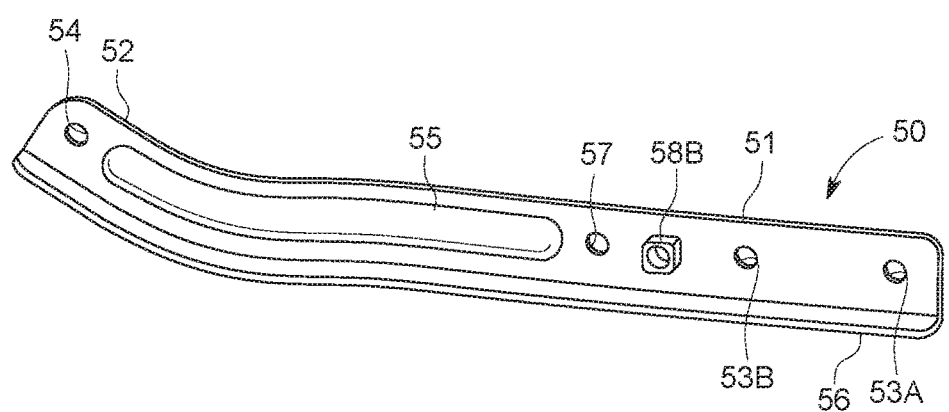
FIG. 5 is a perspective view of an interior of the hinge arm of the hinge assembly.

FIG. 5 is a perspective view of an interior of the hinge arm 50 of the hinge assembly 40. As shown in FIG. 5, the interior facing surface of the hinge arm 50 can have a weld nut 58B attached thereto at the fixing aperture 58A. The weld nut 58B can be configured to encircle the fixing aperture 58A on the interior facing surface of the hinge arm 50. The weld nut 58B can be threaded such that it may communicate with the similarly threaded fixing bolt 59 upon insertion of the fixing bolt 59 through the fixing aperture 58A. The fixing bolt 59 may thereby be secured in place within the weld nut 58B so as to secure the hood bracket 60 against the hinge arm 50, as will be described below. The weldnut 58B can be welded to the hinge arm 50. Alternatively, the weld nut could be a clinch nut (e.g., a piercing nut) or could be attached by adhesive.

Figure 6:
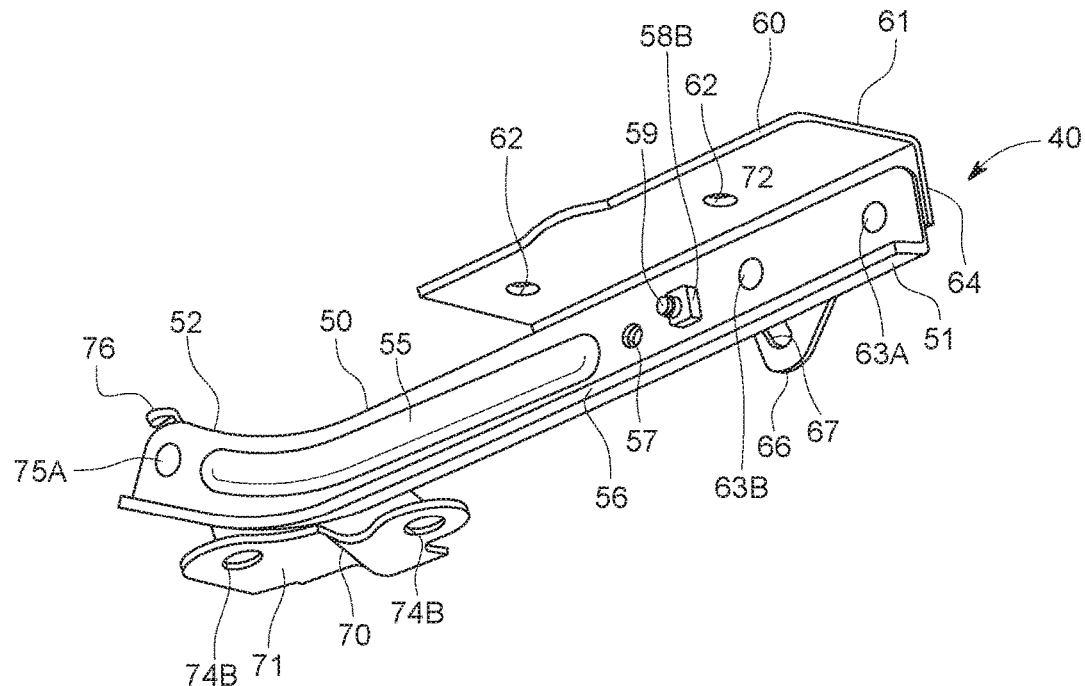
FIG. 6 is a perspective view of the hinge assembly in a normal hood operating condition in accordance with the disclosed subject matter.
Figure 7:
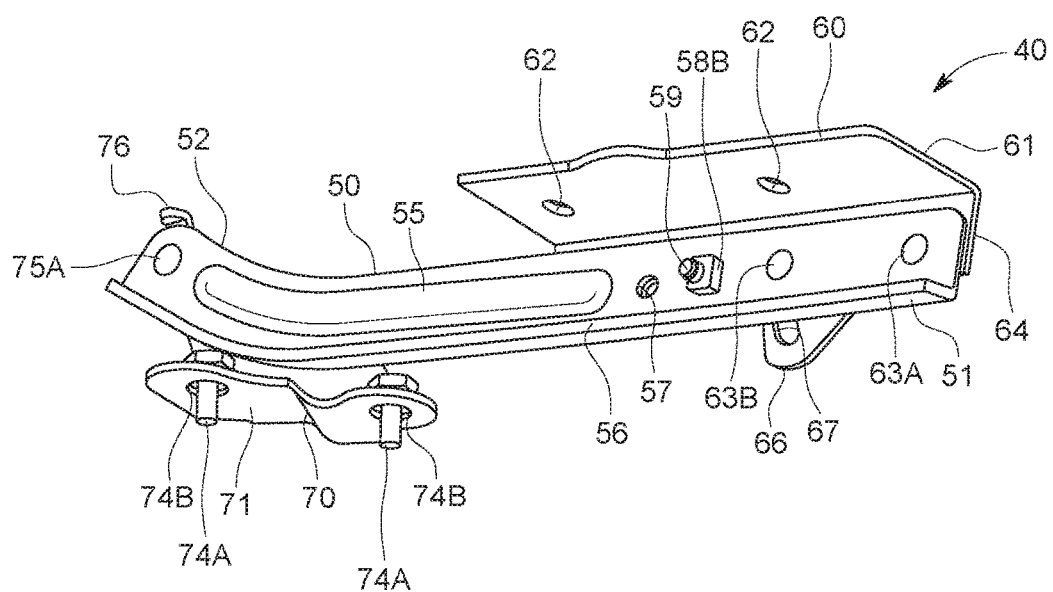
FIG. 7 is a perspective view of the hinge assembly in the normal operating condition.

FIG. 6 is a perspective view of the hinge assembly 40 in the normal operating condition in accordance with the disclosed subject matter. The hinge assembly 40 as shown in FIG. 6 can include the body bracket 70, as described above, with the body bracket 70 being connected to the hinge arm 50 by a hinge axis pin 75A inserted through the upper aperture 75B and the end portion aperture 54, respectively. The body bracket 70 and the hinge arm 50 are thereby configured for rotation relative to each other about the hinge axis pin 75A so as to enable operation of the hood 20 between opened and closed positions.

The body bracket 70 can include body attachment and hinge arm attachment portions 71, 76 approximately perpendicular to each other to facilitate respective attachment to the body 12 and the hinge arm 50. The body attachment portion 71 includes apertures 74B receiving fasteners 74A to connect the bracket 70 to the body 12 (e.g., adjacent the engine compartment). The hinge arm attachment portion 76 includes an aperture 75B receiving a hinge axis pin 75A to connect the bracket 70 to the hinge arm 50. The lower base plate 71 can be stepped as shown. In the depicted embodiment, the body bracket 70 of the body attachment portion 71 includes two apertures 74B receiving fasteners 74A. However, any appropriate number of apertures and fasteners may be included. The fasteners 74A can be threaded bolts, pins, screws, etc.

The aforementioned connection between the body bracket 70 and the hinge arm 50 facilitates opening and closing of the hood 20 during normal operation, as well as lifting of a rearward hood portion during actuation of the hood lift system 30. The present embodiment of the hinge assembly 40 in FIG. 6 is shown in the normal operating condition whereby the hinge assembly 40 has not transitioned to the lift actuated state. Thus, the hood bracket 60 is disposed against the hinge arm 50.

Figure 8:
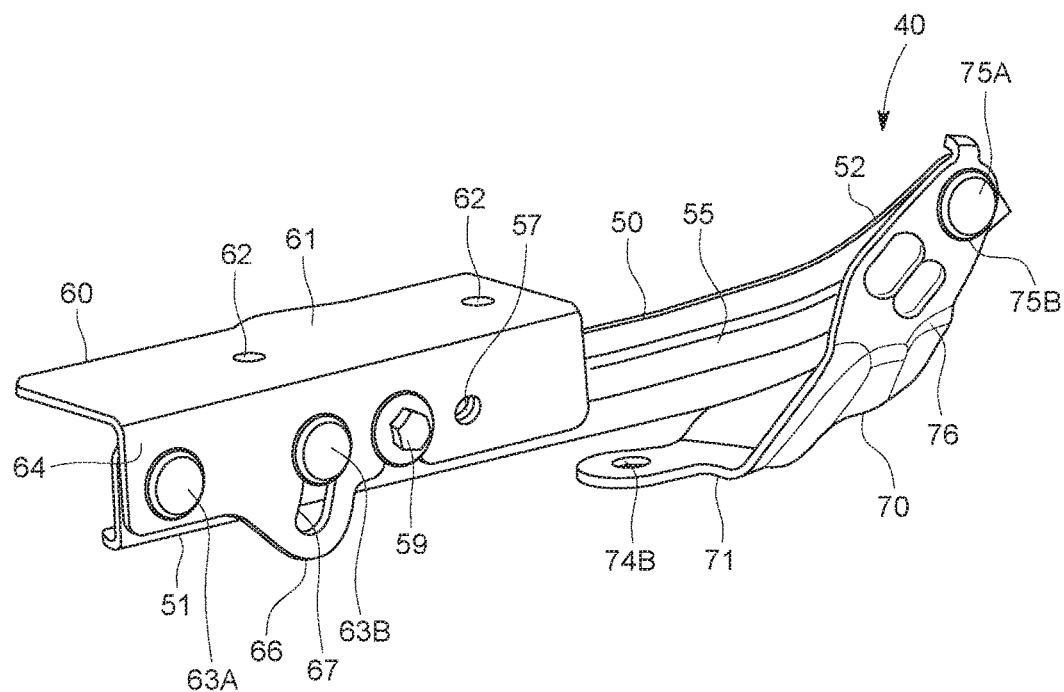
FIG. 8 is a perspective view of the hinge assembly in the normal operating condition.
Figure 10:
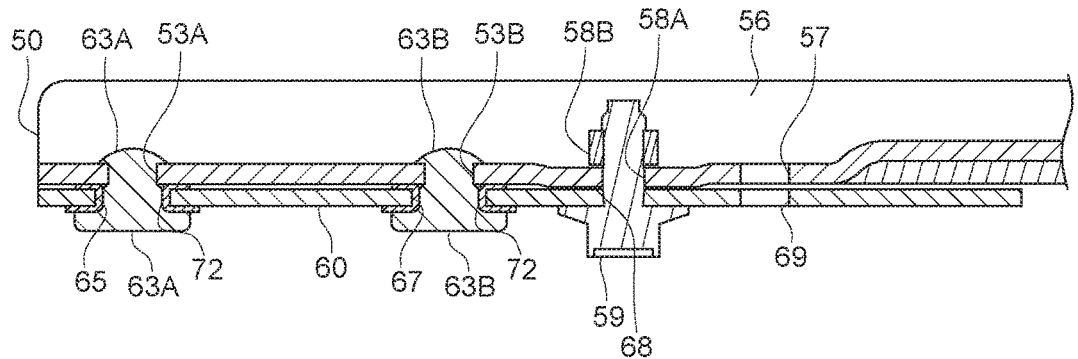
FIG. 10 is a perspective view of a cross-section of the hinge assembly of FIG. 9.
Figure 11:
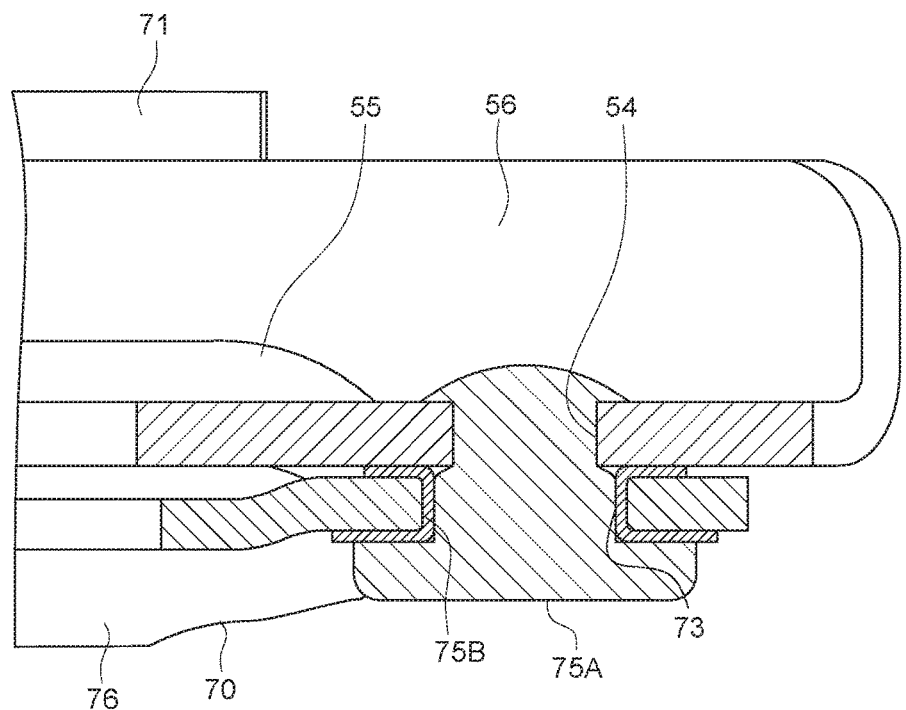
FIG. 11 is a perspective view of a cross-section of the hinge assembly of FIG. 9.

FIG. 8 is a perspective view of the hinge assembly 40 in the normal hood operating condition. Specifically, an exterior of the hinge assembly 40 is shown with the hood bracket 60 and the body bracket 70 shown disposed against the hinge arm 50, as described above. Consequently, the slot engaging pin 63B is shown disposed within an upper portion of the guide slot 67 corresponding to a fully closed position of the hood with the system in the normal hood operating condition. The relative position of the slot engaging pin within the guide slot 67 will not change during normal hood operation between a fully closed hood position and a fully opened hood position. However, during actuation of the hood lift system, the slot engaging pin 63B will be moved towards a lower end of the guide slot 67 as shown in FIGS. 10 and 11 and described below. The lower portion of the guide slot 67 thereby defines a hinge angle limitation for the hood bracket 60 and the hinge arm 50, preventing them from rotating relative to one another about the upper linkage axis beyond the determined limitation.

Figure 9:
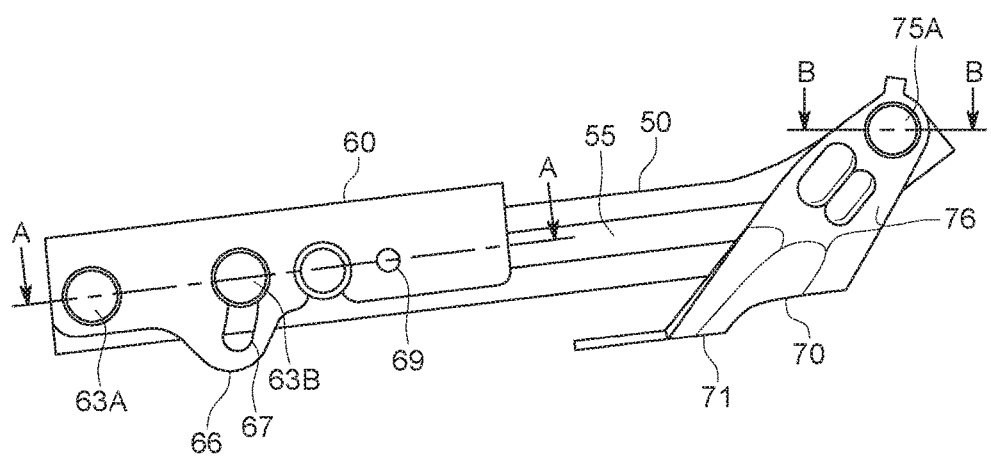
FIG. 9 is a perspective view of a side of the hinge assembly in the normal operating condition.

FIG. 9 is a perspective view of a side of the hinge assembly 40 in the normal hood operating condition. As shown in FIG. 9, the hood bracket 60 is aligned with the hinge arm 50 in the normal hood operating condition to maintain proper operation of the hood, including opening and closing.

FIG. 10 is a perspective view of cross-section A-A of the hinge assembly 40 of FIG. 9. The cross-section A-A shown in FIG. 10 depicts the upper hinge pin 63A inserted through both the linkage axis apertures 53A, 65, and the slot engaging pin 63B inserted through both the linkage axis aperture 53B and the guide slot 67, securing the hood bracket 60 and the hinge arm 50 together. As shown, the linkage axis aperture 65 and the guide slot 67 may have bushings 72 disposed therein to facilitate engagement of the upper hinge pin 63A and the slot engaging pin 63B within the respective linkage axis aperture 65 and guide slot 67. Specifically, the bearings provide bearing surfaces for the respective pins 63A, 63B to contact and rotate/move along during transition between the normal hood operating condition and the hood lift actuated state, as described below.

FIG. 11 is a perspective view of cross-section B-B of the hinge assembly 40 of FIG. 9. The cross-section B-B shown in FIG. 11 depicts the hinge axis pin 75A inserted through both the upper aperture 75B of the body bracket 70 and the end portion aperture of the hinge arm 50, securing the body bracket 70 and the hinge arm 50 together. As shown, the upper aperture 75B may have a bushing 73 disposed therein to facilitate engagement of the hinge axis pin 75A within the upper aperture 75B. Specifically, the bearing provides a bearing surface for the hinge axis pin 75A to contact and rotate/move along during opening and closing of the hood 20 via rotation of the hinge arm 50 in the normal hood operating condition, as described above.

Figure 12:
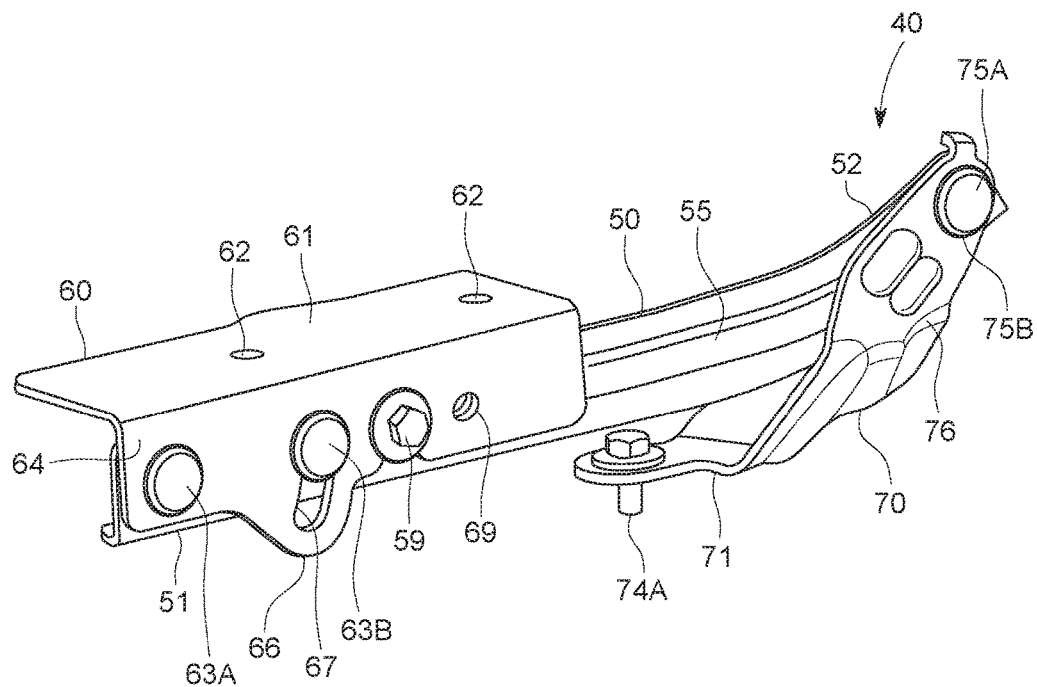
FIG. 12 is a perspective view of the hinge assembly in the normal operating condition.

FIG. 12 is a perspective view of the hinge assembly 40 in the normal operating condition as shown above, with the lower flange fastener 74A shown inserted through the lower flange aperture 74B. The lower flange fastener 74A may serve to connect the body bracket 70 to the body 12 of the vehicle 10, thereby securing the hinge assembly 40 and allowing operation thereof.

Figure 13:
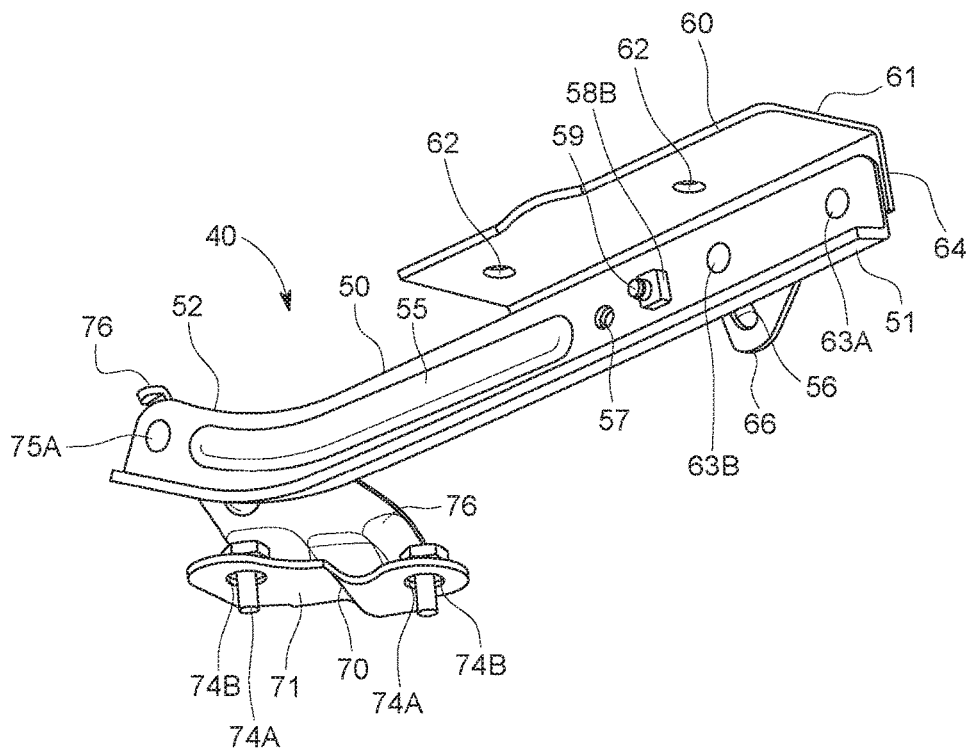
FIG. 13 is a perspective view of the hinge assembly in the normal operating condition configured in an open hood orientation.
Figure 14:
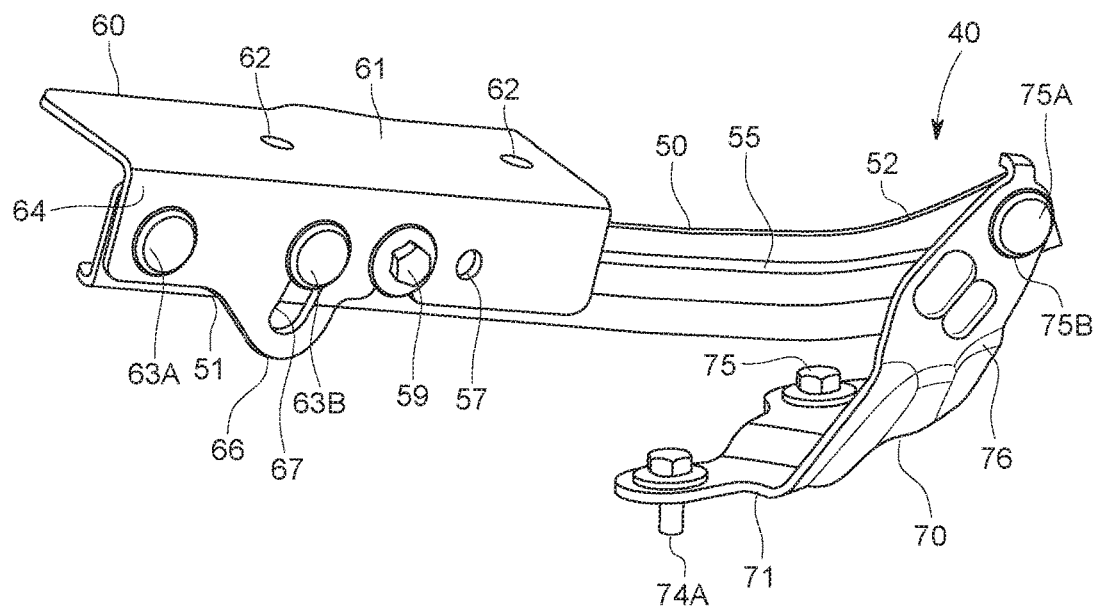
FIG. 14 is a perspective view of the hinge assembly in the normal operating condition and configured in an open hood orientation.

FIGS. 13 and 14 are perspective views of the hinge assembly 40 in the normal operating condition in a hood opened configuration. The hinge arm 50 is shown pivoted away from the body 12 of the vehicle 10 via the body bracket 70, while the hood bracket 60 and the hinge arm 50 remain clamped to each other. As described above, in the normal hood operating condition, the lift actuator 80 has not been actuated and therefore has not rotated the hinge bracket 60 away from the hinge arm 50. Thus, the hood 20 may be transitioned between fully opened and closed positions via rotation about the hinge axis pin 75A while the hood bracket 60 and the hinge arm 50 remain clamped.

Figure 15:
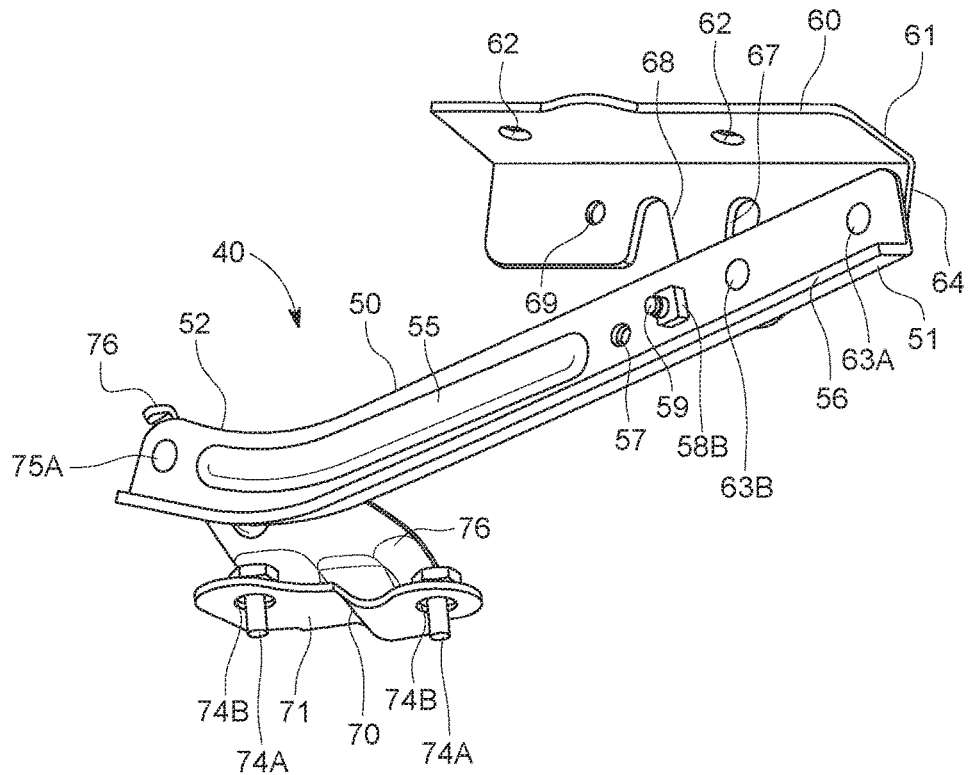
FIG. 15 is a perspective view of the hinge assembly in a lift actuated condition in accordance with the disclosed subject matter.
Figure 16:
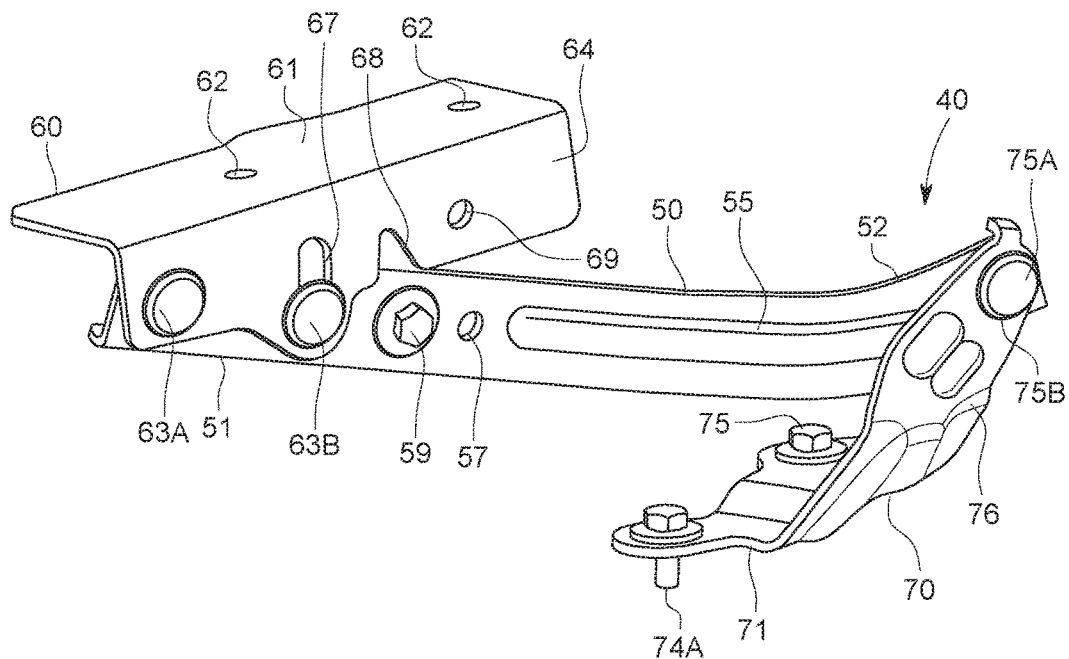
FIG. 16 is a perspective view of the hinge assembly in the lift actuated condition.

FIGS. 15 and 16 show perspective views of the hinge assembly 40 in the hood lift actuated state in accordance with the disclosed subject matter. In the actuated state, at least one of the hood bracket 60 and the body bracket 70 are rotated away from the hinge arm 50 at respective hinge portions as a result of actuation of the lift actuator 80. As will be described below, the lift actuator 80 can thereby enact an upward force on the underside of the hood bracket 60, thereby causing upward rotation of the hood bracket 60 away from the hinge arm 50, as well as upward rotation of the hinge arm 50 away from the body bracket 70, which is fastened to the body 12.

The hinge arm 50 can include the weld nut 58B welded to the interior facing surface at the fixing aperture 58A such that the fixing bolt 59 is inserted therethrough, as described above. The fixing bolt 59 can therefore be threadingly engaged to the weld nut 58B to secure the hood bracket 60 against the hinge arm 50 in the normal hood operating condition through clamping force between a head of the fixing bolt 59 and contact surfaces of the hood bracket 60 adjacent the fixing notch 68. The clamping force on the fixing notch 68 may also result in contact between hood bracket 60 and hinge arm 50 for additional frictional force securing the hood bracket 60 to the hinge arm 50 in the normal operating condition.

As described below, the clamping force can be set to be overcome by the upward forces applied to the hood bracket 60 by the lift actuator 80. Specifically, the clamping force can be set to a level above that required to prevent relative rotation between the hood bracket 60 and the hinge arm 50 during normal hood operation, and the upward forces generated by the lift actuator 80 during actuation of the hood lift system 30. The clamping force can also be set to prevent vibration or lifting of the rearward portion of the hood 20 during high speed operation of the vehicle 10 or in rough road conditions. Thus, force of the lift actuator 80 against the underside of the hood bracket 60 must be greater than the clamping force between the hood bracket 60 and the hinge arm 50 via the fixing bolt 59.

When the actuator 80 applies upward force to hood bracket overcoming the clamping force of fixing bolt 59 and the hood bracket 60 rotates upwardly away from the hinge arm 50, the slot engaging pin 63B moves downwardly through the guide slot 67 while the guide slot 67 rotates upwardly with the hood bracket 60. Therefore, the lower edge of the guide slot 67 is configured to abut the slot engaging pin 63B and thereby prevent the hood bracket 60 from rotating beyond the prescribed limitation.

Figure 17:
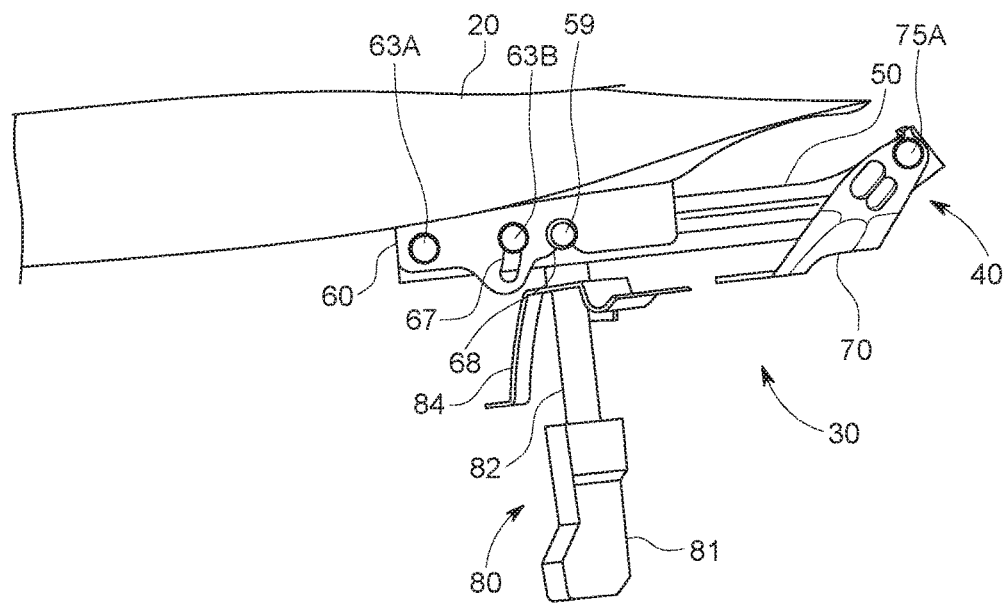
FIG. 17 is a perspective view of the hood lift system connected to an exemplary hood of the vehicle in accordance with the disclosed subject matter, the hood lift system shown in the normal hood operating condition.
Figure 19:
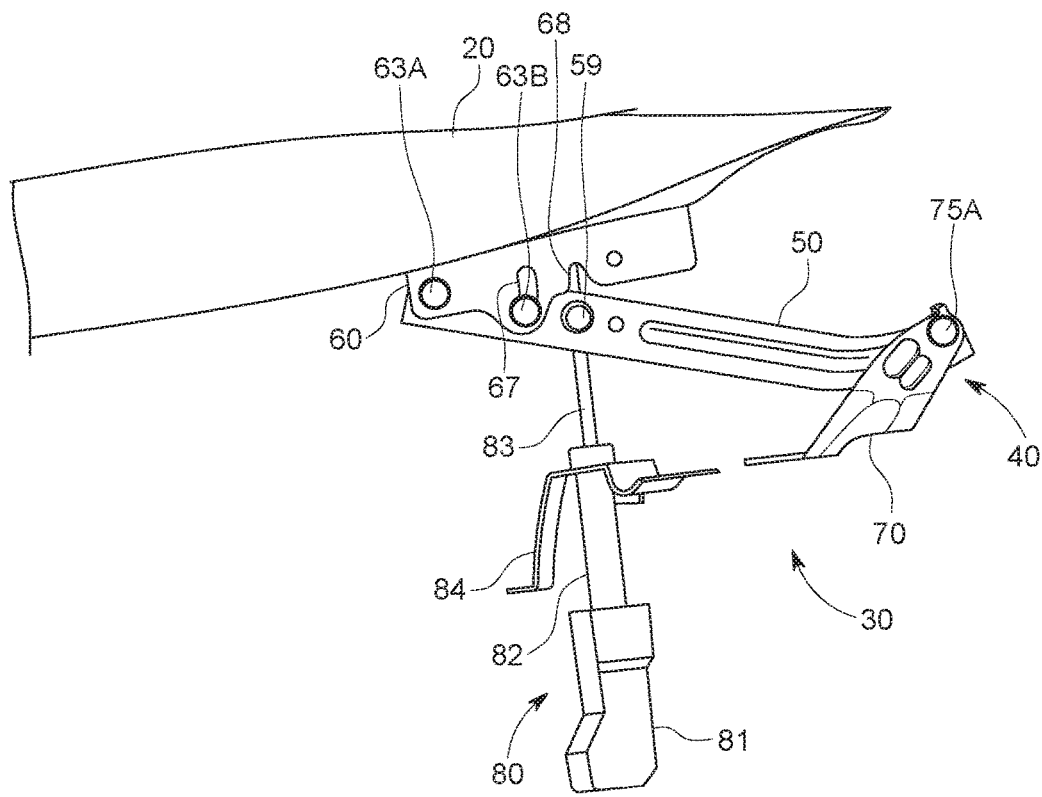
FIG. 19 is a perspective view of the hood lift system connected to the hood of the vehicle, the hood lift system shown in the lift actuated condition.

FIG. 17 is a perspective view of the hood lift system 30 connected to an exemplary hood 20 of the vehicle 10 in accordance with the disclosed subject matter, the hood lift system 30 shown in the normal operating condition. FIG. 17 shows the hood 20 in the closed position relative to the body 12 of the vehicle 10, with the hood lift system 30 and the hood 20 also in the normal operating condition prior to actuation of the lift actuator 80. The above described configuration of the hood 20 and the hood lift system 30 can be altered by detection of an object such as a pedestrian prior to an impact event, as shown in FIG. 19 and described below.

As shown in FIG. 17, when the hood 20 and the hood lift system 30 are in the normal operating condition prior to an impact, both the hood bracket 60 and the body bracket 70 are aligned with the hinge arm 50 such that the hood 20 may lay flush against the body 12 without panel gaps or misaligned edges. The hood 20 may be opened from the body 12 adjacent the engine compartment, while remaining in the normal operating condition for the hood. Thus, opening and closing of the hood 20 via the body bracket 70 can still be performed. It is only once the lift actuator 80 is actuated that the hood 20 and the hood lift system 30 transition to the lift actuated state, as will be described below. In the normal operating condition, the lift actuator 80 can include an outer rod 82 housing an inner rod 83, the inner rod 83 being configured to telescope out of the outer rod 82 upon actuation.

The lift actuator 80 can also include a lower housing 81 connected to a lower end of the outer rod 82. The lower housing houses an actuator mechanism generating the upward force upwardly directing the inner rod 83 during lift actuation. The actuator mechanism can include gun powder for generating the upward force. Alternatively, the actuator mechanism could include a gas generator to pressurize a gas to lift the inner rod 83. The lower housing 81 can be disposed within the engine compartment below the hood 20 and the hinge assembly 40. Arranged in this manner, the lower housing 81 can be oriented such that the inner rod 83 exerts upward force against the hood bracket 60 during hood lift actuation. As shown in more detail in FIG. 2, an upper portion of the inner rod 83 can be disposed adjacent and in contact with the lower surface of the hood bracket 60.

Figure 18:
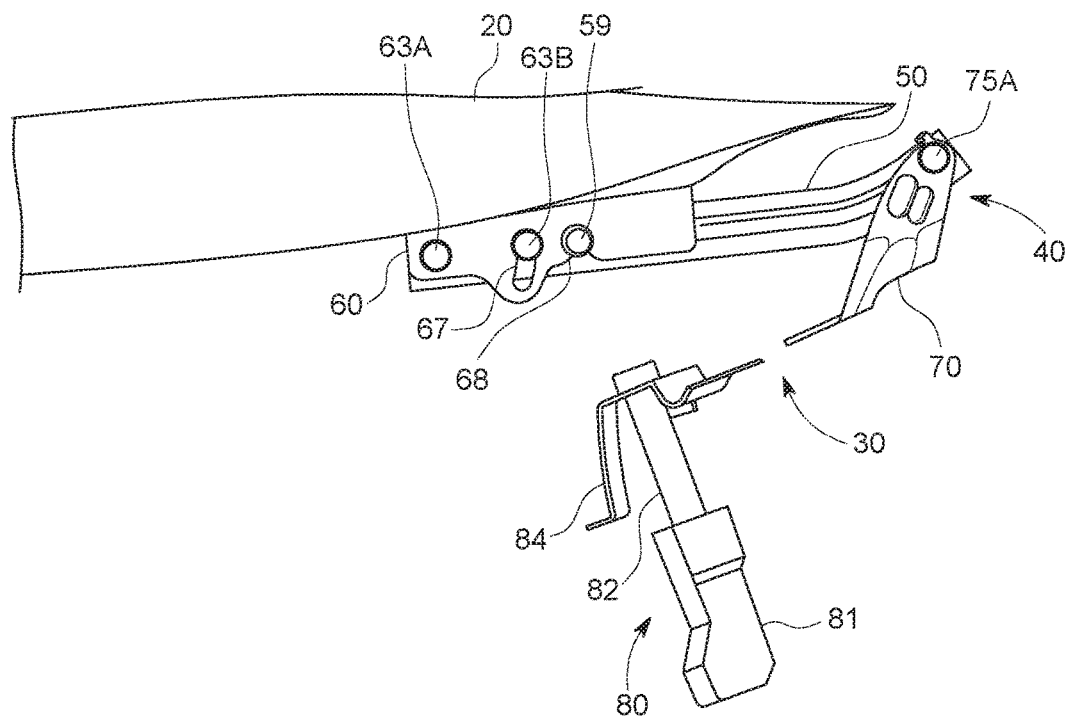
FIG. 18 is a perspective view of the hood lift system connected to the hood of the vehicle, the hood lift system shown in the normal hood operating condition and configured in an opened hood configuration.

The lift actuator 80 can include a mounting bracket 84 configured to secure the hinge actuator 80 to the body 12 (e.g., adjacent the engine compartment). The bracket 84 facilitates proper actuation of the lift actuator 80 by orienting the actuator to prevent misalignment of the telescoping inner rod 83. The depicted bracket includes upper and lower flange portions to facilitate fitment within a particular body configuration. However, the shape of the bracket could change from that shown depending on vehicle design. FIG. 18 is a perspective view of the hood lift system 30 connected to the hood 20 of the vehicle 10, the hood lift system 30 shown in the normal hood operating condition and configured in an opened hood configuration. As described above, the hood 20 can transition between fully opened and fully closed positions via the hinge arms 50 rotating about the respective body brackets 70. In moving between opened and closed positions in the normal hood operating condition, the hood bracket 60 remains clamped to the hinge arm 50.

FIG. 19 is a perspective view of the hood lift system 30 connected to the hood 20 of the vehicle 10, the hood lift system 30 shown in the lift actuated state. In the lift actuated state, the hood bracket 60 is rotated upwardly away from the hinge arm 50 and the hinge arm 50 is rotated upwardly away from the body bracket 70 about respective ends of the hinge arm 50. As described above, the inner rod 83 telescopes upwardly out of the outer rod 82 during lift actuation. As the inner rod 83 extends upward, an upper end of the inner rod 83 contacts a lower surface of the hood bracket 60. The hood bracket 60 is then directed upwardly, pivoting away from the hinge arm 50 such that the connected rear portion of the hood 20 is moved to a lift actuated state with respect to the body 12.

In the lift actuated state following actuation of the lift actuator 80, the slot engaging pin 63B slides into contact with the lower edge of the guide slot 67, preventing further rotation of the hood bracket 60. As described above, the relative rotation between the hood bracket 60 and the hinge arm 50 occurs because the upward force of the inner rod 83 against the hood bracket 60 is configured to be greater than the clamping force of the fixing bolt 59 against the hood bracket 60. When the upward force exceeds the clamping force, the fixing bolt 59 can no longer hold the hood bracket 60 and the hinge arm 50 together. As a result of actuation of the lift actuator 80, the hood bracket 60 and the hinge arm 50 can rotate away from each other. Absent the force applied by the actuator of the hood lift system, such relative rotation is prevented by the clamping force of the notch engaging fixing bolt 59 in the normal hood operating condition.

In the normal operating condition, the hood lift system 30 orients the hood 20 so as to be spaced from rigid vehicle components underlying the hood such as the engine. Therefore, if a collision event results in contact between a pedestrian and the hood 20, the lifting of the rear portion of the hood creates a buffer zone between the hood 20 and underlying rigid vehicle components. The hood lift system 30 is configured to maintain the rear portion of the hood 20 in a lifted condition following pedestrian contact with the hood (i.e., under pedestrian loading applied to hood). In addition, the hinge assembly 40 is sufficiently robust to remain undeformed and fixed longitudinally during non-pedestrian collisions (e.g., vehicle/vehicle or vehicle/tree) in which longitudinal impact loads are applied to the hood. Under these conditions, the hood is deformed (e.g., by buckling) but the hinge assembly 40 will remain fixed. This protects vehicle occupants by preventing rearward movement of the hood hinge that might otherwise occur if hinge structure was deformed and weakened.

As described above, exemplary vehicles can include a plurality of hood lift systems, and included lift actuators, such as two or more. In the present embodiment, the vehicle includes a pair of hood lift systems having actuators incorporated therein, each hood lift system being disposed at opposing sides of the rear portion of the vehicle hood.

IV. Bumper Assembly

Figure 20:
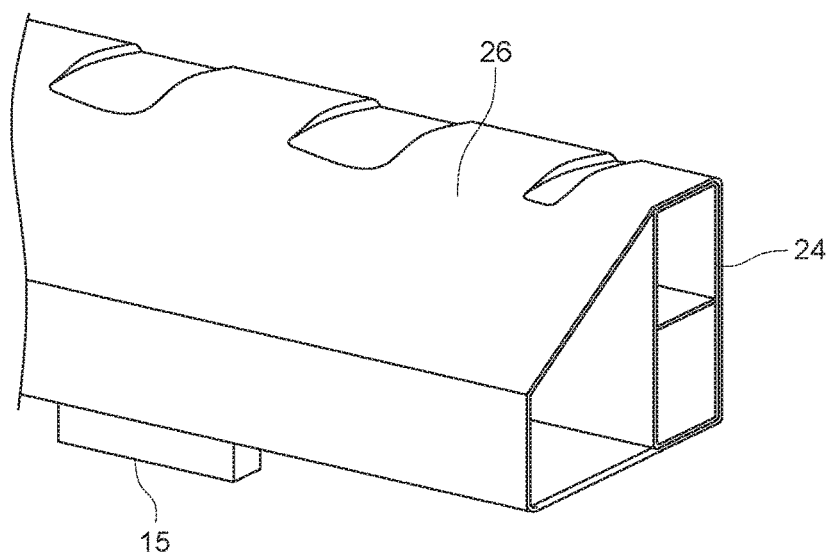
FIG. 20 is a partial perspective view of exemplary components of a bumper assembly in accordance with the disclosed subject matter.

FIG. 20 is a partial perspective view of exemplary components of the bumper beam assembly 16 in accordance with the disclosed subject matter. The bumper beam assembly 16 can include a bumper beam 24, a safety plate 26, and the bumper sensors 15. The bumper beam assembly 16 can be connected to a front end of the vehicle such that the engine compartment is located between the bumper beam assembly 16 and the windshield.

The bumper beam 24 can be configured as a structural element extending across a front end of the vehicle. The safety plate 26 can be configured to extend from the bumper beam 24 so as to provide additional structure within the bumper beam assembly 16 from which the bumper sensors 15 can be mounted. In the present embodiment, the bumper beam assembly 16 can include three bumper sensors 15 mounted at intervals along the safety plate such that the bumper sensors 15 are configured to detect collision events. However, any appropriate number of and spacing between bumper sensors 15 may be included to accurately detect collision events. The bumper sensors 15 can communicate with a vehicle ECU in tandem with vehicle speed sensors disposed proximate the front wheels 14 and/or rear wheels. The vehicle ECU can be integrated with supplemental restraint systems such as the exemplary hood lift system 30. The bumper sensors 15 can include accelerometers detecting g-loads.

V. Method of Operation

When a collision is detected by the bumper sensors 15, the hood lift system 30 is actuated to lift the rear portion of the hood 20 away from underlying rigid vehicle components such as the engine. The configuration of the hood lift system 30 is such that deformation of the hood bracket 60, the hinge arm 50, and the body bracket 70 is limited while permitting pivoting of the hood bracket 60 with respect to the hinge arm 50 from the normal hood operating condition into the lift actuated state. As discussed above, this is provided by the clamping force of the fixing bolt 59 configured to prevent relative rotation between the hood bracket 60 and the hinge arm 50 during normal hood operating conditions while allowing such relative rotation in response to actuator loading during actuation of the hood lift system 30. Additionally, the hood bracket 60, hinge arm 50 and body bracket 70 are sufficiently robust to retain their integrity during actuation of the hood lift system 30. This facilitates return of the system 30 to the normal hood operating condition (i.e., returning hood bracket 60 and hinge arm 50 to the relative positions of FIGS. 6-14 and re-engaging the notch-engaging bolt 59 in notch 68 without substantial repair time or costs. As discussed above, the datum apertures 57, 69 can be used (i.e., with a datum pin) to ensure proper angular positioning between the hinge arm 50 and the hood bracket 60 at which to engage the notch-engaging bolt 59.

VI. Alternative Embodiments

While certain embodiments of the invention are described above, and FIGS. 1-20 disclose the best mode for practicing the various inventive aspects, it should be understood that the invention can be embodied and configured in many different ways without departing from the spirit and scope of the invention.

For example, embodiments are disclosed above in the context of the hood lift system 30 configured for connection with the hood 20 of the vehicle 10 as shown in FIGS. 1-19. However, embodiments are intended to include or otherwise cover hood lift systems connected to other vehicle panels such a front bumper, doors, a trunk of the vehicle disclosed above.

For example, exemplary embodiments are intended to include the hood bracket 60 connected to the hood 20 and rotatably joined to the hinge arm 50. This configuration can have the lift actuator 80 configured to lift the hood 20 via the connected hood bracket 60 upwardly away from the body 12. In another alternative embodiment, the lift actuator 80 can be configured to lift another body panel away from the body 12 in various directions such as, for instance, the trunk or tailgate during reverse maneuvers.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A hinge assembly for use with a vehicle hood lift system having a hood attached to a body and an actuator moving at least a rear portion of the hood away from the body, the hinge assembly comprising:
   a hood bracket connected to the hood, the hood bracket including a side plate defining a slot having a perimeter entirely bounded by the side plate so as to be spaced from a side plate edge, the side plate also defining a notch open at the side plate edge, a rod of the actuator being disposed adjacent and in contact with a lower surface of the hood bracket; and
   a hinge arm having a first end rotatably connected to the body and an opposite second end rotatably connected to the hood bracket, the hinge arm including a slot engagement member that extends into the slot so as to limit a range of rotation of the hood bracket relative to the hinge arm, the hinge arm including a notch engagement member that is extendable into the notch and configured to removably secure the hinge arm to the hood bracket to limit rotational movement therebetween, the notch engagement member also being configured to disengage from the hood bracket upon application of a predetermined force to allow the hood bracket to rotate relative to the hinge arm within the range provided by the slot engagement member, and the hood bracket rotating relative to the hinge arm when the rod of the actuator applies a force against the hood bracket that exceeds the predetermined force.

2. The hinge assembly according to claim 1, wherein the slot is arcuate.

3. The hinge assembly according to claim 2, wherein a lower end of the slot is configured to be contacted by the slot engagement member to limit relative movement between the hinge arm and the hood bracket.

4. The hinge assembly according to claim 1, wherein the notch engagement member includes a fastener is received by an opening in the hinge arm, the notch engagement member being configured to clamp the hood bracket to the hinge arm.

5. The hinge assembly according to claim 4, wherein the notch engagement member includes a bolt and nut assembly.

6. The hinge assembly according to claim 4, wherein the hood bracket and hinge arm are adapted for return to a normal hood operating condition following an actuation of the lift system actuator, the opening in the hinge arm for the notch engagement member being located adjacent the notch of the hood bracket in the normal hood operating condition, and wherein the notch engagement member is configured to be re-engaged within the notch to clamp the hood bracket to the hinge arm.

7. The hinge assembly according to claim 1, wherein the slot engagement member includes a pin received by an aperture in the hinge arm proximate the slot of the hood bracket.

8. The hinge assembly according to claim 7, wherein the slot is configured as an aperture that enables the slot engagement member to extend through the slot.

9. The hinge assembly according to claim 1, further comprising a body bracket connected to the body and rotatably connected to the first end of the hinge arm.

10. The hinge assembly according to claim 1, wherein an underside of the hood bracket is configured to receive the actuator, and thereby move the hood bracket away from the hinge arm.

11. A vehicle hood assembly for use with a vehicle body, the vehicle hood assembly comprising:
a hood attached to the body;
an actuator which moves the hood away from the body;
a hood bracket connected to the hood, the hood bracket including a side plate that defines a slot having a perimeter that is entirely bounded by the side plate so as to be spaced from a side plate edge, the side plate also defining a notch that is open at the side plate edge, a rod of the actuator being disposed below a lower surface of the hood bracket; and
a hinge arm having a first end rotatably connected to the vehicle body and an opposite second end rotatably connected to the hood bracket, the hinge arm including a slot engagement member that extends into the slot so as to limit a range of rotation of the hood bracket relative to the hinge arm, the hinge arm including a notch engagement member that extends into the notch and configured to removably secure the hinge arm to the hood bracket to limit rotational movement therebetween, the notch engagement member also being configured to disengage from the hood bracket upon application of a predetermined force to allow the hood bracket to rotate relative to the hinge arm within the range provided by the slot engagement member, the hood bracket rotating relative to the hinge arm by the rod of the actuator contacting and applying force against the lower surface of the hood bracket.

12. The vehicle hood assembly according to claim 11, wherein the slot is arcuate.

13. The vehicle hood assembly according to claim 12, wherein a lower end of the slot is configured to be contacted by the slot engagement member to limit movement of the hood away from the body.

14. The vehicle hood assembly according to claim 11, wherein the notch engagement member is a fastener received by an opening in the arm, the notch engagement member being configured to clamp the bracket to the arm.

15. The vehicle hood assembly according to claim 14, wherein the notch engagement member includes a bolt and a nut, the bolt passes through the hinge arm and extends into the slot, the nut is threaded onto the bolt such that the nut and bolt clamp the hinge arm and the hood bracket between the nut and the bolt when the bolt extends into the slot, and such that the nut and the bolt remain attached to the hinge arm when the bolt is disengaged from the hood bracket by the predetermined force.

16. The vehicle hood assembly according to claim 15, wherein the notch engagement member is configured to be re-tightened against the bracket and the arm following movement of the hood away from the body, the hood configured to be moved back toward the body prior to re-tightening.

17. The vehicle hood assembly according to claim 11, wherein the slot engagement member is a pin received by an aperture in the arm proximate the slot.

18. The vehicle hood assembly according to claim 17, wherein the slot is configured as an aperture that enables the slot engagement member to extend through the slot.

19. The vehicle hood assembly according to claim 11, further comprising a body bracket rotatably connected to the first end of the hinge arm, and wherein an underside of the bracket is configured to receive the rod of the actuator.

20. A method of manufacturing a hinge assembly for use with a vehicle hood assembly that includes a hood attached to a body and an actuator that moves at least a rear portion of the hood away from the body, the method comprising:
configuring a side plate of a hood bracket, which is connectable to the hood, so as to define a slot having a perimeter that is entirely bounded by the side plate so as to be spaced from a side plate edge;
forming a notch in the side plate that is open at the side plate edge;
rotatably connecting a first end of a hinge arm to the body;
rotatably connecting an opposite second end of the hinge arm to the hood bracket;
configuring the arm to include a slot engagement member that extends into the slot so as to limit a range of rotation of the hood bracket relative to the hinge arm;
providing a notch engagement member for the hinge arm, the notch engagement member extendable into the notch and configured to removably secure the arm to the hood bracket to limit rotational movement therebetween;
configuring the notch engagement member to disengage from the hood bracket upon application of a predetermined force to allow the hood bracket to rotate relative to the arm within the range provided by the slot engagement member;

providing an actuator having a rod, the rod being disposed below a lower surface of the hood bracket; and contacting and applying a force to the lower surface of the hood bracket by the rod of the actuator to rotate the hood bracket relative to the hinge arm.

* * * * *